Patented May 9, 1933

1,908,091

UNITED STATES PATENT OFFICE

HAROLD E. WHITE, OF ZELIENOPLE, PENNSYLVANIA

METHOD OF TREATING TRICALCIUM PHOSPHATE

No Drawing. Original application filed February 9, 1928, Serial No. 253,228, now Patent No. 1,823,015, dated September 15, 1931. Divided and this application filed September 10, 1931. Serial No. 562,200.

This application is a division of that filed by me February 9, 1928, Serial No. 253,228, for a method of treating tricalcium phosphate.

My present invention relates generally to the treatment of phosphate rock (tricalcium phosphate) and the production of calcium sulphide by means of such treatment.

Heretofore calcium sulphide has been produced by various methods, one of such methods depending upon the reduction of calcium sulphate by means of carbon. This has been accomplished according to the following reaction:

$$CaSO_4 + 4C = CaS + 4CO$$

Another method of producing calcium sulphide has been accomplished by passing hydrogen sulphide gas over red hot lime according to the following reaction:

$$CaO + H_2S = CaS + H_2O$$

The first above mentioned process requires a high temperature and is best performed in an electric furnace. The second above named process requires elaborate equipment and an expensive gas which must be first generated before the process is begun.

When the sulphides of the heavy metals (such as lead sulphide, cuprous sulphide, zinc sulphide, iron sulphide and iron disulphide or iron pyrites) are roasted or smelted in order to get rid of the sulphur, the reaction causes much loss of heat since it is exothermic.

It has also been a practice of the art in the production of elemental phosphorus or phosphorus pentoxide to smelt phosphate rock (tricalcium phosphate). In this process it has been necessary first to reduce the phosphorus and flux the lime with a cheap acid, silica being generally used, which reacts acid at high temperatures.

My invention utilizes the sulphur from one of the above described processes and the free lime from the other in forming calcium sulphide, which is accomplished according to any one of the following reactions:

$$2Ca_3(PO_4)_2 + 6FeS + 16C = \\ 6CaS + 3Fe_2P + P + 16CO$$

$$Ca_3(PO_4)_2 + 3PbS + 8C = \\ 3CaS + 3Pb + 2P + 8CO$$

$$Ca_3(PO_4)_2 + 3Cu_2S + 8C = \\ 3CaS + 6Cu + 2P + 8CO$$

$$Ca_3(PO_4)_2 + 3ZnS + 8C = \\ 3CaS + 3Zn + 2P + 8CO$$

Irrespective of any of the intermediate reactions (that is, the reactions occurring between the beginning and the end of the method herein described—such, for example, as the formation of calcium carbide and/or calcium phosphide) the final result is the simultaneous production of calcium sulphide and phosphorus with a relatively small quantity of the metal or metallic phosphide, depending upon the character of the original sulphide used.

My invention is best carried out in a crucible type electric furnace which is provided with a roof and which can be maintained practically air tight. The furnace is under a slight vacuum so that the volatile products may be carried to the condensing apparatus and the gases disposed of to best advantage. In carrying out my invention in such a furnace, the calcium sulphide, ferrophosphorus or lead or copper may be tapped off at regular intervals from the crucible and are easily separated by gravity while in their molten state.

Ordinary foundry coke may be employed as the source of carbon or the charge may be briquetted by using a coking coal or tar binder, the coal or tar, or a similar substance, then acting entirely or in part as the reducing agent.

When my invention is carried out as in the first above equation, the ferrophosphorus gives a metal containing about 21% phosphorus, which is the most usual one formed under normal pressures. As is well known the phosphorus in ferrophosphorus seldom exceeds 25% in the best electric furnace practice.

When lead, copper, or zinc are employed some compounds of the various metals may be formed, such as $Zn_3P_2$, but by controlling the temperatures in the collection apparatus, the production of such compounds may be regulated.

It is also possible to produce phosphorus pentasulphide and phosphorus trisulphide according to the following reactions:

$$9FeS_2 + 2Fe_2P = 13FeS + P_2S_5$$
$$7FeS_2 + 2Fe_2P = 11FeS + P_2S_3$$

Since, however, iron disulphide breaks up into iron sulphide and sulphur at a temperature below the formation point of ferrous phosphide, this reaction does not cause much trouble.

The economical advantages of my process can readily be seen. Whereas the sulphides from smelting sulphide ores are largely wasted or made into sulphuric acid, they can, by means of my invention, be safely disposed of and utilized to advantage.

In the manner thus above described, it is possible to produce a substantially pure calcium sulphide. As is well known, the constituents of ordinary phosphate rock, besides tricalcium phosphate, are chiefly iron oxide, alumina, calcium fluoride, and silica. The major portion of the iron oxide is reduced and reports as ferrophosphorus; the alumina remains as aluminum sulphide, while the silica reports partly as silicon in the ferrophosphorus and as silicon sulphide which is volatilized from the furnace.

By means of my invention I am able to economically produce phosphorus as well as phosphoric acid.

In producing phosphorus, the furnace is charged with suitable quantities of tricalcium phosphate (phosphate rock), iron sulphide (iron disulphide), coke or its equivalent. Sufficient heat is then applied to produce the phosphorus and sulphur vapors or fumes, which vapors or fumes are suitably collected in a gas main leading from the furnace and then collected in a suitable condenser. Care should be taken during the production of phosphorus to exclude all air from the furnace. Thus elemental phosphorus may be produced.

In making phosphoric acid by means of my invention, the furnace is charged with suitable quantities of the tricalcium phosphate (phosphate rock), iron sulphide (or iron disulphide), coke or its equivalent, as in the case of the initial step in the production of phosphorus. During the reduction process for making phosphoric acid, a suitable quantity of air is admitted into the furnace. The reduction of the charge in the furnace thus arranged will produce phosphorus and sulphur vapors which are oxidized to phosphorus pentoxide and sulphur dioxide by the admitted air and then let off in a suitable way through a gas main from the furnace into a conduit from which they are lead into a condenser or the well known Cottrell electrical precipitator. While passing through such conduit, a suitable amount of moisture is added to the vapors.

During the process thus described, the following reactions take place:

$$2P_2 + 5O_2 = 2P_2O_5$$
$$2P_2O_5 + 2H_2O = 4HPO_3 \text{ (metaphosphoric acid)}$$
$$4HPO_3 + 2H_2O = 2H_4P_2O_7 \text{ (pyrophosphoric acid)}$$
$$2H_4P_2O_7 + 2H_2O = 4H_3PO_4 \text{ (orthophosphoric acid) the final product.}$$
$$S + O_2 = SO_2$$

The novel feature of this method as applied to phosphoric acid resides in the fact that the phosphorus vapors and sulphur vapors do not act in the same manner, the sulphur going only to $SO_2$, whereas it takes $SO_3$ to make sulphuric acid. By reason of this fact, the two vapors can be separated in the Cottrell precipitator and the $SO_2$ later oxidized and converted to sulphuric acid. By means of my invention, it is, therefore, possible to use sulphide slags in the smelting of tricalcium phosphate (phosphate rock) whether elemental phosphorus or phosphoric acid is produced.

It should be noted that in carrying out my method, there is a large amount of carbon monoxide which results from the reactions set forth. If desired, this carbon monoxide can be disposed of commercially, or it may be used in my method for preheating the stock and the air.

In practicing my invention for the manufacture of phosphoric acid, it is characterized by the fact that a relatively large amount of sulphur is driven off from the furnace charge along with the phosphorus (especially if iron disulphide is used as the source of the sulphur). The sulphur burns to sulphur dioxide and the phosphorus to $P_2O_5$. The latter is strongly hygroscopic, while the former is weakly so. In the collection of phosphoric acid by means of the Cottrell electrical precipitator, the discharge from the Cottrell electrical precipitator will be practically free from $P_2O_5$ and contain appreciable quantities of sulphur dioxide, which later may be collected and manufactured into sulphuric acid in accordance with well known practices.

Should the sulphide slag become too viscous during the operation of the furnace, then easily fusible sulphides (such as aluminum sulphide, potassium sulphide, or magnesium sulphide) which form eutectics with calcium sulphide may be introduced into the slag.

In this way and by this selective precipitation phosphoric acid practically free from sulphuric or sulphurous acids may be obtained.

In carrying out my invention the quantities of iron added to the furnace charge may be increased or decreased depending upon the proportion of ferrophosphorus and volatilized phosphorus desired.

When it is desired to produce phosphoric acid, it is possible to use a fuel fired furnace such as a cupola or blast type furnace, and thus take advantage of the large quantity of carbon monoxide generated by preheating the blast.

As is well known, the use heretofore of the fuel fired furnace for smelting phosphatic materials has been found to be uneconomical due to the large volume of practically worthless slag to be handled, the necessity of making it very acid so that it may be easily tapped and the resultant gummy nature of the stock due to the formation of a volatile siliceous slag which condenses in the stock and prevents the uniform escape of the gases.

By using my herein described process, the nature of the stock is so porous that gases easily filter through and, moreover, there is little sticky slag present which condenses in the stock and plugs the pores thereof.

Having thus described my invention, what I claim is:

1. A method of treating tricalcium phosphate by charging a furnace with suitable quantities of tricalcium phosphate, a heavy metal sulphide, and coke, then applying sufficient heat to create the volatile vapors by maintaining a temperature in the furnace below the point of dissociation of the calcium sulphide but high enough to liberate the heavy metal from its sulphide, also maintaining in the furnace a slight vacuum, and then at suitable intervals tapping off from the furnace the heavy metal and the sulphide slag, whereby a sulphide slag is produced.

2. A method of treating tricalcium phosphate by charging a furnace with suitable quantities of tricalcium phosphate, a heavy metal sulphide, and coke, then applying sufficient heat to create the volatile vapors by maintaining a temperature in the furnace below the point of dissociation of the calcium sulphide but high enough to liberate the heavy metal from its sulphide, also maintaining in the furnace a slight vacuum, then separating by gravity the heavy metal from the sulphide slag while in the molten condition, and then collecting and condensing the volatile products.

3. A method of treating tricalcium phosphate by charging a furnace with suitable quantities of tricalcium phosphate, a ferro sulphide, and coke, then applying sufficient heat to create the volatile vapors by maintaining a temperature in the furnace below the point of dissociation of the calcium sulphide but high enough to liberate the heavy metal from its sulphide, also maintaining in the furnace a slight vacuum, and then at suitable intervals tapping off from the furnace phosphide of the heavy metal and the sulphide slag, whereby a heavy metal phosphide is produced.

In testimony whereof, I have hereunto signed my name.

HAROLD E. WHITE.